United States Patent [19]

Gautier et al.

[11] Patent Number: 5,711,203
[45] Date of Patent: Jan. 27, 1998

[54] PNEUMATIC BRAKE BOOSTER

[75] Inventors: Jean Pierre Gautier; Ulysse Verbo, both of Aulnay-Sous-Bois; Miguel Perez Revilla, Argenteuil, all of France

[73] Assignee: Bosch Systems De Freinage, Drancy, France

[21] Appl. No.: 507,359

[22] PCT Filed: Aug. 17, 1995

[86] PCT No.: PCT/FR95/01086

§ 371 Date: Aug. 23, 1995

§ 102(e) Date: Aug. 23, 1995

[87] PCT Pub. No.: WO96/07574

PCT Pub. Date: Mar. 14, 1996

[30] Foreign Application Priority Data

Sep. 8, 1994 [FR] France .................. 94 10732

[51] Int. Cl.⁶ ............................ F15B 9/10
[52] U.S. Cl. ............................ 91/376 R
[58] Field of Search ..................... 91/376 R

[56] References Cited

U.S. PATENT DOCUMENTS

| | | | |
|---|---|---|---|
| 4,898,073 | 2/1990 | Seip et al. ........... | 91/369.2 |
| 5,546,846 | 8/1996 | Bauer ................ | 91/376 R |
| 5,651,300 | 7/1997 | Ikeda et al. .......... | 91/376 R |

*Primary Examiner*—Sheldon Richter

*Attorney, Agent, or Firm*—Leo H. McCormick

[57] ABSTRACT

A pneumatic brake booster having a casing (10) with an axis of symmetry (X–X') divided in a leaktight fashion by a movable wall structure (12) into a front chamber (14) permanently connected to a source of low pressure, and a rear chamber (16). The rear chamber (16) is connected selectively to the front chamber (14) or a source of high pressure by a three-way valve means (36). The three-way valve means (36) is actuated by a control rod (30) capable of pressing, via a front face of a plunger (28), on a rear face of a push rod (56) secured to a reaction disc (58) when a plunger (28) slides in a bore (26) of the movable wall (12). The three-way valve (36) includes a valve element (36) located in a tubular rear part (22) of the movable wall (12) and interacts via of an annular front face (40) with a first annular valve seat (28a) formed on the plunger (28) and with a second annular valve seat (20a) formed on the movable wall (12). The first valve seat (28a) is concentric with the second valve seat (20a) and a smaller diameter. The annular front face (40) of the valve element (36) is able to move in the tubular rear part (22) of the movable wall (12) and sealed therein by outer and inner edges. The annular front face (40) of the valve (36) has a least one opening (46) causing a chamber (44) to be situated behind the annular front face (40) of valve (36) to communicate with a space (35) situated between the first valve seat (28a) and the second valve seat (20a). The resultant of forces generated by the low pressure and high pressure exerted on the plunger (28) is permanently and essentially negligible.

4 Claims, 1 Drawing Sheet

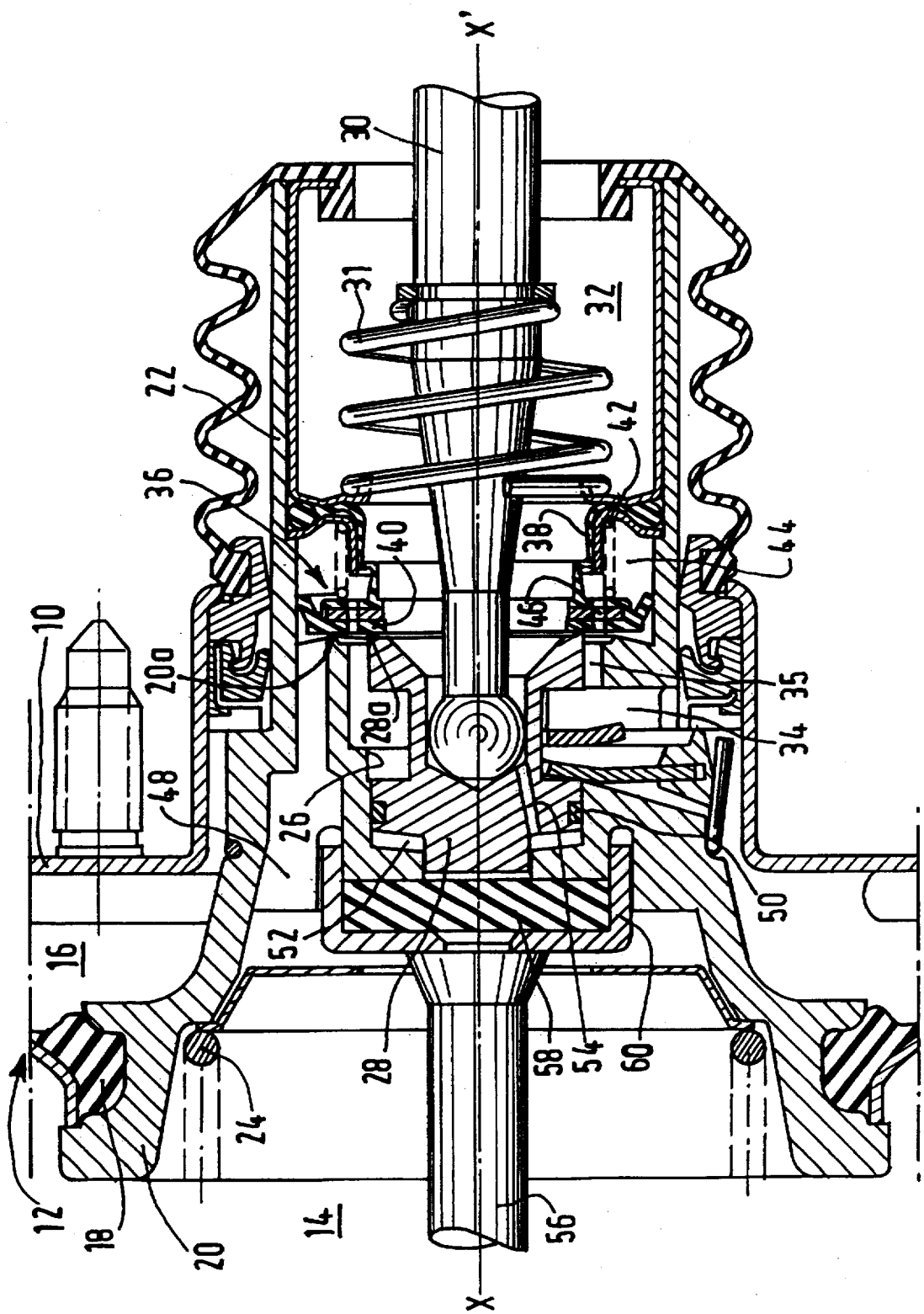

PNEUMATIC BRAKE BOOSTER

The present invention relates to pneumatic boosters of the type used to boost the braking in motor vehicles.

Such boosters are well known and commonly employed in the automobile field. They include a casing fixed to the bulkhead separating the engine compartment from the passenger compartment, so that they can be actuated by a brake pedal situated in the passenger compartment and can actuate the primary piston of a master cylinder situated in the engine compartment and connected to the brakes of the vehicle by a hydraulic circuit.

For the purpose of optimizing the operation of these boosters, and also the "feel" experienced by the driver when he presses on the brake pedal, it has for a long time been sought to decrease what is termed the effort of attack, that is to say the force necessary to actuate the booster.

Now, it has been noted that there is a lower physical limit below which this effort of attack cannot drop. In effect, after having been actuated, a booster restores a certain force, termed return force, when it resumes its position of rest. It can easily be understood that the effort of attack cannot be less than the return force.

For example, document WO 94/04403 makes known a booster corresponding to the preamble of the main claim, in which the effort of attack is reduced by providing means for causing the pressure prevailing in the rear chamber of the booster to act on the rear face of the shut-off element constituting the three-way valve of a booster.

This known booster includes a casing having an axis of symmetry divided in leaktight fashion by a movable wall structure into a front chamber permanently connected to a source of low pressure, and a rear chamber connected selectively to the front chamber or to a source of high pressure by a three-way valve means actuated by a control rod capable of pressing, via the front face of a plunger, on the rear face of a push rod, the plunger sliding in a bore of the movable wall, the three-way valve including a valve element located in a tubular rear part of the movable wall and interacting via an annular front face with a first annular valve seat formed on the plunger and with a second annular valve seat formed on the movable wall, the first valve seat being concentric with the second valve seat and of smaller diameter, the annular front face of the valve element being able to move in the tubular rear part of the movable wall and being sealed in the latter via its outer edge and via its inner edge, the annular front face of the valve including at least one opening causing a chamber situated behind the annular front face of the valve to communicate with the space situated between the first valve seat and second valve seat.

Such an arrangement makes it possible to distribute the pressure differences over the various elements making up the three-way valve, and thus reduce the stresses at rest and in the operating position of the various return springs used for the operation of the three-way valve. It follows that the effort of attack required to compress these springs to begin with may be decreased.

However, this known booster still has quite a substantial effort of attack with regard to the current requirements of motor manufacturers, which effort it would therefore be appropriate to decrease.

SUMMARY OF THE INVENTION

The object of the present invention is therefore to provide a booster in which the effort of attack is as small as possible, and to this end it proposes to reduce still further the return force thereof.

To this end, according to the present invention, the resultant of the forces generated by the low pressure and by the high pressure exerted on the plunger is permanently zero or negligible.

Other objects, features and advantages of the present invention will emerge more clearly from the description which follows of one embodiment given by way of illustration with reference to the appended drawings in which:

BRIEF DESCRIPTION OF THE DRAWINGS

The single FIGURE is a side view in longitudinal section representing the rear central part of a pneumatic brake booster produced in accordance with the present invention.

The FIGURE represents the rear central part of a pneumatic brake booster designed to be placed in the usual fashion between the brake pedal of a vehicle and the master cylinder controlling the hydraulic braking circuit of this vehicle. By convention, the part of the booster pointing towards the master cylinder is termed the "front" and the part pointing towards the brake pedal is termed the "back". In the FIGURE, the front is therefore to the left and the rear to the right.

The booster represented comprises an outer casing 10 in the form of a shell, having symmetry of revolution about an axis X-X'. Only the rear central part of this casing 10 is represented in the FIGURE.

A movable wall structure 12 delimits inside the casing 10 a front chamber 14 and a rear chamber 16. The movable wall 12 is associated with a flexible rolling diaphragm made of elastomer, the internal peripheral edge of which is received in leaktight fashion by virtue of a bead 18 in a hollow boost piston 20 located along the axis of X-X' of the booster, and the outer peripheral edge (not represented) of which is fastened in leaktight fashion to the outer casing 10.

The hollow piston 20 extends towards the rear in the form of a tubular part 22 which passes in leaktight fashion through the rear wall of the casing 10. A compression spring 24 interposed between the piston 20 and the front wall (not represented) of the casing 10 normally keeps the piston 20 in the rear position of rest illustrated in the FIGURE, in which the rear chamber 16 has its minimum volume and the front chamber 14 its maximum volume.

In the central part of the movable wall situated forwards of the rear tubular part 22, the piston 20 has a bore 26 in which a plunger 28 is received with sliding. The front end of a control rod 30 of the booster, also located along the X-X' axis, is mounted so that it swivels in a blind bore of the plunger 28.

The rear end (not represented) of the control rod 30, which projects outside the tubular part 22, is controlled directly by the brake pedal of the vehicle (not represented) and is returned to its position of rest by a return spring 31.

The annular space 32 around the control rod 30 can communicate with the rear chamber 16 through a radial passage 34 formed in the central part of the piston 20, when boost means controlled by the plunger 28 are actuated.

In a way known, for example, by the aforementioned document, these boost means comprise a three-way valve including an annular valve 36 and two concentric annular valve seats 20a and 28a formed respectively at the rear of the central part of the piston 20 and at the rear of the plunger 28. The seat 28a has a smaller diameter than that of the seat 20a, a space 35 being left between these two seats and communicating with the radial passage 34.

The valve 36 is of tubular overall shape, and has a rear part 38 fixed in leaktight fashion into the tubular part 22 and an annular front face 40 which can move along the axis X-X', this front face being urged forwards by a spring 42.

The annular front face 40 is connected to the rear part 38 by its inner peripheral edge, and it slides in leaktight fashion inside the tubular part 22 via its outer peripheral edge, so that together with the rear part 38 it defines a chamber 44.

The annular front face includes openings 46 causing this chamber 44 to communicate with the space 35 situated between the valve seats 20a and 28a.

In accordance with the present invention, the plunger 28 is mounted with leaktight sliding in the bore 26 by virtue of a seal 50 located in a peripheral groove of the plunger and interacting with the wall of the bore 26, as has been represented, or which could, as an alternative, be received in a groove of the bore 26 and interact with the outer surface of the plunger.

The seal 50 thus delimits, in front of the plunger 28, inside the bore 26, a volume 52 which permanently communicates with the annular space 32 by virtue of a substantially axial drilling 54.

When the whole of the booster is in the position of rest, the control rod 30 as well as the plunger 28 are urged towards the rear, the latter then bearing via the seat 28a on the face 40 and lifting the latter off the seat 20a slightly, so that the three-way valve normally establishes communication between the two chambers 14 and 16 of the booster via the radial passage 34 and a substantially axial passage 48 formed in the central part of the piston 20.

Under these conditions, the pressure prevailing in the chamber 44 is equal to the low pressure prevailing in the front chamber 16 of the booster, and the front face 40 of the valve 36 is pressed against the seat 28a by the high pressure prevailing in the annular space 32. The spring 42 intended to urge the front face 40 forwards can therefore exert only a very low force.

What is more, by virtue of the drilling 54, the volume 52 is in communication with the annular space 32, where the pressure of the high pressure source prevails. The plunger 28 is therefore subjected, on the one hand, to the force that the front face 40 of the valve 36 exerts on the seat 28a and, on the other hand, to the force generated by pressure prevailing in the volume 52 and exerting it on the cross-section of the plunger sliding in the bore 26.

The present invention makes it possible to gain perfect control of these forces, and in particular makes it possible very simply to render their resultant zero by contriving for the diameter of the bore 26 to be equal to the diameter of the seat 28a. In effect, the high pressure is therefore exerted on the plunger 28 on its front face in the volume 52, that is to say over the surface area of the section S which slides in the bore 26, and on its rear face over the surface delimited by the seat 28a. As these two surface areas are equal, or very close if manufacturing tolerances are taken into account, the resultant of the forces generated by the low pressure and by the high pressure exerted on the plunger is thus zero or negligible.

When the driver of the vehicle actuates the brake pedal, this results in a forwards movement of the control rod 30, of the plunger 28 and of the valve 36 which, firstly, isolates the chambers 14 and 16 from one another by closing the valve passage 20a-40, then, secondly, opens the valve passage 28a-40 and allows communication between the rear chamber 16 and the annular space 32 via the space 35 and the passage 34.

In this operating phase, the pressure in the rear chamber 16 of the booster increases, as it does in the chamber 44 until it reaches as a maximum the value of the high pressure prevailing in the annular space 32, the booster then being in what might be called a saturation phase.

The pressure increasing in the rear chamber 16 of the booster creates a pressure difference on the movable wall 12, generating a boost force which tends to move it forwards, this force being transmitted to a push rod 56 by an annular front face of the piston 20 acting on a reaction disc 58, on the central part of which the front face of the plunger 28 bears.

During this operating phase, the pressure at the periphery of the plunger 28 varies between the low pressure permanently present in the front chamber 14 of the booster and the high pressure present in the annular space 32. However, as in the previous situation, the high pressure is exerted on the plunger 28 on its front face delimited by the section S for sliding in the bore 26, and on its rear face over the surface area delimited by the seat 28a. The resultant of the forces generated by the high pressure and by the variable pressure exerted on the plunger is here again zero or negligible.

What is more, it can be seen that the reaction disc 58 is located between the push rod 56, situated in the front chamber of the booster where the low pressure prevails, and the plunger 28, for which it has been seen that the front face is situated in the volume 52 where the high pressure prevails. Advantageously, the present invention makes provision for achieving sealing between the front chamber of the booster and the volume 52 simply, with the aid of the reaction disc 58. For example, the reaction disc 58 may be forcibly fitted into a housing 60 integral with the push rod 56.

When the driver of the vehicle releases his effort on the brake pedal, the control rod 30 as well as the plunger 28 are returned to their rear position by the rod spring 31. The seat 28a of the plunger 28 then comes into abutment against the front face 40 of the valve 36 and causes it to move back significantly, so that the valve passage 20a-40 opens wide. In this operating phase the pressure in the rear chamber 16 of the booster drops abruptly owing to the communication thus established with the front chamber 14.

The pressure at the periphery of the plunger 28 therefore drops as far as the low pressure value present permanently in the front chamber 14 of the booster. As in the previous operating phases, the high pressure is exerted on the plunger 28 on its front face delimited by the section S for sliding in the bore 26, and on its rear face over the surface area delimited by the seat 28a. The resultant of the forces generated by the high pressure and by the variable pressure exerted on the plunger is here again zero or negligible.

It can therefore be understood that during this phase of return to the position of rest following an operating phase of the booster, the return spring 31 no longer has to overcome a variable force generated by the variable pressure surrounding the plunger, as it does in the prior art as represented in the aforementioned document. It follows that this spring 31 may have a much lower preload at rest, and that the return force of the booster is thus reduced in a significant proportion. It is therefore possible to reduce in the same proportion the effort of attack of the booster so as to be able to meet the current requirements of motor manufacturers.

Of course, the invention is not limited to the embodiments which have been described, but in contrast is capable of receiving numerous modifications which will be obvious to the person skilled in the art, without departing from the scope of the appended claims.

We claim:

1. A pneumatic brake booster having a casing with an axis of symmetry divided in a leaktight fashion by a movable wall structure into a front chamber permanently connected to a source of low pressure, and a rear chamber connected selectively to the front chamber or a source of high pressure by a three-way valve means actuated by a control rod capable of pressing, via the front face of a plunger, on a rear face of a push rod secured to a reaction disc, said plunger sliding in a bore of the movable wall, said three-way valve including a valve element located in a tubular part of said movable wall and interacting via an annular front face with a first annular valve seat formed on said plunger and with a second annular valve seat formed on said movable wall, said first valve seat being concentric with said second valve seat formed on said movable wall, said first valve seat being concentric with said second valve seat and of a smaller diameter, said annular front face of said valve element being able to move in said tubular rear part of said movable wall and being sealed with said movable wall at an outer edge and an inner edge, said annular front face of said valve including at least one opening causing a chamber situated behind said annular front face of said valve to communicate with a space situated between said first valve seat and said second valve seat, said three-way valve being characterized in that said plunger slides in a leaktight fashion inside said bore of said movable wall by virtue of a seal which within said bore of said movable wall delimits a volume in which said front face of said plunger moves, the pressure prevailing in said volume exerting on said plunger a force such that the resultant of forces generated by said low pressure and high pressure exerted on said plunger is permanently and essentially negligible.

2. The pneumatic brake booster as recited in claim 1, characterized in that said volume in which said front face of said plunger moves communicated with said source of high pressure through an axial drilling made in said plunger.

3. The pneumatic brake booster as recited in claim 2 characterized in that said diameter of said bore in said movable wall is equal to the diameter of said first valve seat formed on said plunger.

4. The pneumatic brake booster as recited in claim 3, characterized in that said reaction disc provided sealing between said front chamber of said booster and said volume in which said front face of said plunger moves.

* * * * *